United States Patent
England (10) Patent No.: US 9,961,529 B2
(45) Date of Patent: May 1, 2018

(54) OPTIMIZING USE OF NEAR FIELD COMMUNICATION (NFC) AT NFC-ENABLED INTERACTION TERMINALS

(71) Applicant: BANK OF AMERICA CORPORATION, Charlotte, NC (US)

(72) Inventor: Tony England, Tega Cay, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days. days.

(21) Appl. No.: 15/231,153

(22) Filed: Aug. 8, 2016

(65) Prior Publication Data

US 2018/0041860 A1 Feb. 8, 2018

(51) Int. Cl.
| | |
|---|---|
| H04W 4/80 | (2018.01) |
| H04W 4/00 | (2018.01) |
| H04B 5/00 | (2006.01) |
| H04W 12/06 | (2009.01) |
| G06Q 20/10 | (2012.01) |

(52) U.S. Cl.
CPC .......... *H04W 4/80* (2018.02); *G06Q 20/1085* (2013.01); *H04B 5/0031* (2013.01); *H04W 4/008* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 2011/0244796 | A1* | 10/2011 | Khan | H04W 4/008 455/41.1 |
| 2012/0011070 | A1* | 1/2012 | Ward | G06Q 20/20 705/72 |
| 2013/0297390 | A1* | 11/2013 | Jaquez | G06Q 20/36 705/14.23 |

* cited by examiner

*Primary Examiner* — Alejandro Rivero
(74) *Attorney, Agent, or Firm* — Michael A. Springs; Moore & Van Allen PLLC; James C. Edwards (57) ABSTRACT

The invention provides for optimizing Near Field Communications (NFC) at a NFC-enabled interaction terminal configured for conducting user interactions. The invention provides for a user to designate which user credentials are applied to which type of NFC-enabled interaction terminals. A NFC-enabled interaction terminal-specific Application Identifier (AID) is assigned to the user credentials, and, in use, the AID list that is communicated, via NFC, by a mobile communication device to the NFC-enabled interaction terminal includes the NFC-enabled interaction terminal-specific AID, which implements an AID selection order that prioritizes use of the AID. In response, the application executing on the mobile communication device processes commands from the NFC-enabled interaction terminal using the pre-designated user credentials.

10 Claims, 3 Drawing Sheets

OPTIMIZING USE OF NEAR FIELD COMMUNICATION (NFC) AT NFC-ENABLED INTERACTION TERMINALS

FIELD OF THE INVENTION

The present invention is related to near field communication and, more specifically, optimizing near field communications at NFC-enabled interaction terminals.

BACKGROUND

Digital wallets, otherwise referred to as mobile wallets, are becoming increasing more popular. A digital wallet allows for a user to load into the digital wallet and use multiple user credentials, for example, driver's license, payment cards (e.g., credit cards, debit cards and the like) and the like. In use, instead of presenting the actual physical embodiment of the user credentials (i.e., the physical card) during an interaction, the user may present the digital wallet and the user credentials are communicated to the NFC-enabled interaction terminal (i.e., point-of-sale device, Automated Teller Machine (ATM) or the like) via Near Field Communication (NFC) technique. By not having to present the physical embodiment of the user credentials, a safety measure is afford, in that the interaction is much less susceptible to someone wrongful acquiring a user's credentials, such as through skimming or some other wrongful action.

Typically, for financial transaction interactions conducted with a digital wallet one of the user credentials (i.e., a payment card/account) will be designated as the default user credentials that are used for a digital wallet-based interaction/transaction. As dictated by digital wallet configuration, the default user credentials may be designated by the user or the default user credentials may be the last-in-time user credentials used. However, in the event that the default user credentials are not the user credentials associated with a specific type of NFC-enabled interaction terminal, (for example, an ATM or the like may require specific user credentials), a user may incur unnecessary delay in attempting to conduct an interaction. For example, if the default user credentials is a credit card/account and an ATM only processes a debit card/account, when the user presents the digital wallet at the ATM and the default card (i.e., the credit card/account) is attempted to be applied to the interaction, the user is either presented with an error message or is required to conduct an additional action to change out the user credentials (e.g., provide an additional tap (i.e., paring and communication session) at the ATM or reconfigure their digital wallet such that the correct user credentials (i.e., the debit card) is applied to the interaction). Such an additional action requirement on the part of the user is burdensome and may either delay the interaction, cause the user to abandon use of the digital wallet for this particular interaction or forego the interaction altogether.

Therefore, a need exists to be able to implement a digital wallet such that default user credentials are automatically applied to those interactions requiring such and that other user credentials, which may be application-specific, are automatically applied to other transactions requiring such. The desired improvement should be seamless at the point of interaction, such that the user does not incur any delay in the interaction nor is required to perform any additional actions. In this regard, the desired improvement should not require that the user tap the NFC reader at the interaction apparatus more than once (i.e., conduct more than one pairing and communication session) nor reconfigure their digital wallet at the time of the interaction to change out user credentials. Moreover, the desired improvement should not require additional software and/or significant modifications to existing software at the NFC-enabled interaction terminal.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, methods computer program products and the like for allowing seamless use of an NFC interaction application to insure that (1) default user credentials are automatically applied to Near Field Communication (NFC) interactions/transactions requiring such and (2) other user-designated user credentials are automatically applied to other NFC interactions/transactions requiring such.

In accordance with embodiments of the invention, such seamless use of the NFC interaction application occurs automatically; without the user occurring any delay during the interaction/transaction and without the user having to perform any additional actions (e.g., additional taps (i.e., pairings and communication sessions) of the mobile communication device to the NFC reader or otherwise additionally interacting with the NFC-enabled interaction terminal (e.g., ATM or identification terminal) or NFC interaction application executing on the mobile communication device to change out the requisite user credentials. In addition, present embodiments of the invention may be implemented without having to add additional (or significantly modify existing) software, modules or the like at the NFC-enabled interaction terminal.

According to specific embodiments of the invention, a user will access the NFC interaction application (e.g., digital wallet) or an auxiliary application in network communication with the NFC interaction application to assign one of the user credentials to a specific type of NFC-enabled interaction terminal. In response to a user assigning user credentials to different types of NFC-enabled interaction terminals and/or different entities NFC-enabled interaction terminals, the NFC interaction application is provided an Application Identifier (AID) associated with the assigned user credentials and NFC-enabled interaction terminals.

In use, when the NFC interaction application is implemented by the mobile communication device at the NFC-enabled interaction terminal associated with the assigned user credentials, a single tap (i.e., single pairing and communication session) is all that is required to initiate NFC communication, from the NFC interaction application to the NFC-enabled interaction terminal, of the list of AIDs stored by the NFC interaction application, which includes the AID associated with the assigned user credentials and NFC-enabled interaction terminals. In turn, the NFC-enabled interaction terminal, implements an AID selection order which indicates priority to the AID associated with the assigned user credentials and NFC-enabled interaction terminals and selects the AID associated with the assigned user credentials and NFC-enabled interaction terminals for further interaction processing. In response, the NFC interaction application processes the remaining commands of the NFC communication session against the user credentials designated by the user (as opposed to the default user credentials).

A system for optimizing Near Field Communication (NFC) at an NFC-enabled interaction terminal defines first embodiments of the invention. The system includes an NFC-enabled interaction terminal. Which include a first memory, a first processor, a Near Field Communication (NFC) reader, and a NFC module. The NFC module is stored in the first memory, executable by the first processor and configured to implement the NFC reader to conduct interactions at the NFC-enabled interaction terminal using NFC. The system additionally includes a mobile communication device that includes a second memory, a second processor, an NFC component, and an NFC interaction application. The NFC interaction application is stored in the second memory, executable by the second processor and the NFC component, and stores (i.e., has loaded for use) a plurality of user credentials. The NFC interaction is configured to, in response to a single tap to the NFC reader, automatically apply a user-designated one of the user credentials to an interaction performed at the NFC-enabled interaction terminal.

In specific embodiments of the system, the NFC interaction application is further configured to automatically apply the user-designated one of the user credentials to the interaction in place of applying one of the other user credentials that are designated as default user credentials for interactions on other terminals.

In other specific embodiments of the system, the NFC interaction application is further configured to assign an interaction terminal-associated Application Identifier (AID) to the user-designated one of the user credentials. In such embodiments of the system, in use, the NFC interaction application is further configured to, in response to receiving a credential request command from the NFC module, communicate, via NFC, a list of AIDs to the NFC module, wherein the list of AIDs includes the interaction terminal-associated AID. In further such embodiments of the system, the NFC module is further configured to, in response to receiving the list of AIDs, (i) implement a predetermined AID selection order to select the interaction terminal-associated AID for performing interactions on the NFC-enabled interaction terminal, and (ii) communicate, via a NFC, an AID select command to the NFC interaction application that indicates selection of the interaction terminal-associated AID. In other related embodiments of the system, the NFC interaction application is further configured, in response to receiving the AID select command, process further commands from the NFC-enabled interaction terminal using the user credentials associated with the interaction terminal-associated AID.

In further specific embodiments of the system, the NFC interaction application is configured to receive one or more user inputs, wherein each input designates one of the user credentials to a corresponding associated type of NFC-enabled interaction terminal. In other related embodiments the system further includes an auxiliary application that is stored in third memory, executable by a third processor, and in distributed network communication with the NFC interaction application. The auxiliary application is configured to (i) receive one or more user inputs, wherein each input designates one of the user credentials to a corresponding associated type of NFC-enabled interaction terminal and (ii) communicate the designations to the NFC interaction application.

In specific embodiments of the system, the NFC-enabled interaction terminal is further defined as one of an Automated Teller Machine (ATM) or an identification terminal and the NFC interaction application is further defined as a digital or mobile wallet application.

In still further related embodiments of the system, modification to the NFC module is limited to updating an AID selection order such that the interaction terminal-associated AID is first in the AID selection order.

A mobile communication apparatus for optimizing Near Field Communication (NFC) at an NFC-enabled interaction terminal defines second embodiments of the invention. The apparatus includes a computing platform including a memory, at least one processor in communication the memory, a Near Field Communication (NFC) component, and a NFC interaction application. The NFC interaction application is stored in the memory, executable by the processor and the NFC component, and stores (i.e., loads and uses) a plurality of user credentials. The NFC interaction application is configured to, in response to a single tap to an NFC reader associated with an NFC-enabled interaction terminal, automatically apply a user-designated one of the user credentials to an interaction performed at the NFC-enabled interaction terminal.

In specific embodiments of the apparatus, the NFC interaction application is further configured to automatically apply the user-designated one of the user credentials to the interaction in place of applying one of the other user credentials that are designated as default credentials for interactions on other terminals.

In other specific embodiments of the apparatus, the NFC interaction application is further configured to assign an interaction terminal-associated Application Identifier (AID) to the user-designated one of the user credentials. In further related embodiments, in use, the NFC interaction application is further configured to (i) communicate, via NFC, a list of AIDs to an NFC module at the NFC-enabled interaction terminal, wherein the list of AIDs includes the interaction terminal-associated AID and, in response to communicating the list of AIDs, (ii) process further commands from the NFC-enabled interaction terminal using the user credentials associated with the interaction terminal-associated AID.

In still further embodiments of the apparatus, one of the NFC interaction application or an auxiliary application in network communication with the NFC interaction application is configured to receive one or more user inputs, wherein each input designates one of the user credentials to a corresponding associated type of NFC-enabled interaction terminal.

In still further embodiments of the apparatus, the NFC-interaction application is further defined as a digital or mobile wallet application.

A method for optimizing Near Field Communication at an NFC-enabled interaction terminal, defines third embodiments of the invention. The method includes receiving a user input that designates user credentials for performing interactions via a NFC interaction application at either a specified type of NFC-enabled interaction terminal. The method additionally includes assigning a predetermined interaction terminal-associated Application Identifier (AID) to the designated user credentials and including the interaction terminal-associated AID in a list of AIDs stored within the NFC interaction application. The method further includes, in response to a single tapping of a device that includes the NFC interaction application at an NFC reader disposed within the NFC-enabled interaction terminal, automatically applying the designated user credentials to an interaction performed at the NFC-enabled interaction terminal.

In specific embodiments of the method, automatically applying further includes automatically applying the user-designated one of the user credentials to the interaction in place of applying one of the other user credentials that are designated as default credentials for interactions on other terminals.

In other specific embodiments of the method, automatically applying further includes communicating, from the NFC interaction application via NFC, the list of AIDs to an NFC module disposed at the NFC-enabled interaction terminal. In further such embodiments of the method, automatically applying further includes, in response to communicating the list of AIDs, processing, at the NFC interaction application, further commands from the NFC-enabled interaction terminal using the user credentials associated with the interaction terminal-associated AID. In still further related embodiments of the method, receiving the user input further comprises receiving, by the computing device processor the user input at one of the NFC interaction application or an auxiliary application in network communication with the NFC interaction application.

Thus, systems, apparatus, methods, and computer program products herein described in detail below provide for optimizing the user experience at an NFC-enabled interaction terminal when using an NFC interaction by seamlessly providing for user-designated user credentials to be automatically/applied to the interaction/transaction as opposed to the default user credentials.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS
OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal allocation. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Thus, embodiments of the present invention provide for seamless use of a NFC communications at a NFC-enabled interaction terminal, such as an ATM, identification terminal or the like by allowing a user to pre-designate which user credentials will be applied to a specific type or a specific entity's NFC-enabled interaction terminal(s), overriding any other default user credentials that are applied at other NFC-enabled interaction terminals. Such pre-designation of user credentials provides for a seamless means for changing out user credentials in those instances in which the user prefers one user credentials over another or where the NFC-enabled interaction terminal is configured to only apply certain ones of the user credentials.

In accordance with embodiments of the invention, such seamless use of NFC communications occurs automatically; without the user occurring any delay during the interaction/transaction and without the user having to perform any additional actions (e.g., additional taps (i.e., pairings and communication sessions) of the mobile communication device to the NFC reader or otherwise additionally interacting with the NFC-enabled interaction terminal (e.g., ATM or identification terminal) or NFC interaction application (e.g., mobile/digital wallet application) to change out the requisite user credentials. In addition, present embodiments of the invention may be implemented without having to add additional (or significantly modify existing) software, modules or the like at the NFC-enabled interaction terminal.

According to specific embodiments of the invention, a user will access the NFC interaction application or an auxiliary application in network communication with the NFC interaction application to assign one of the user credentials to a specific type of NFC-enabled interaction terminal. For example, the user may assign one of the user credentials to Automated Teller Machines (ATMs) or to a specific entities ATMs (e.g., Financial Institution X's ATMs). In this regard, a user may assign different ones of the user credentials to different types of NFC-enabled interaction terminals and/or different entities NFC-enabled interaction terminals. In response to a user assigning user credentials to different types of NFC-enabled interaction terminals and/or different entities NFC-enabled interaction terminals, the NFC interaction application is provided an Application Identifier (AID) associated with the assigned user credentials and NFC-enabled interaction terminals.

In use, when the NFC interaction mobile communication device is implemented at the NFC-enabled interaction terminal associated with the assigned user credentials, a single tap (i.e., single pairing and communication session) is all that is required to initiate NFC communication, from the application to the NFC-enabled interaction terminal, of the list of AIDs stored by the NFC interaction application, which includes the AID associated with the assigned user credentials and NFC-enabled interaction terminals. In turn, the NFC-enabled interaction terminal, implements an AID selection order which indicates priority to the AID associated with the assigned user credentials and NFC-enabled interaction terminals and selects the AID associated with the assigned user credentials and NFC-enabled interaction terminals for further interaction processing. In response, the NFC interaction application processes the remaining commands of the NFC communication session against the user credentials designated by the user (as opposed to the default user credentials).

Figure 1:
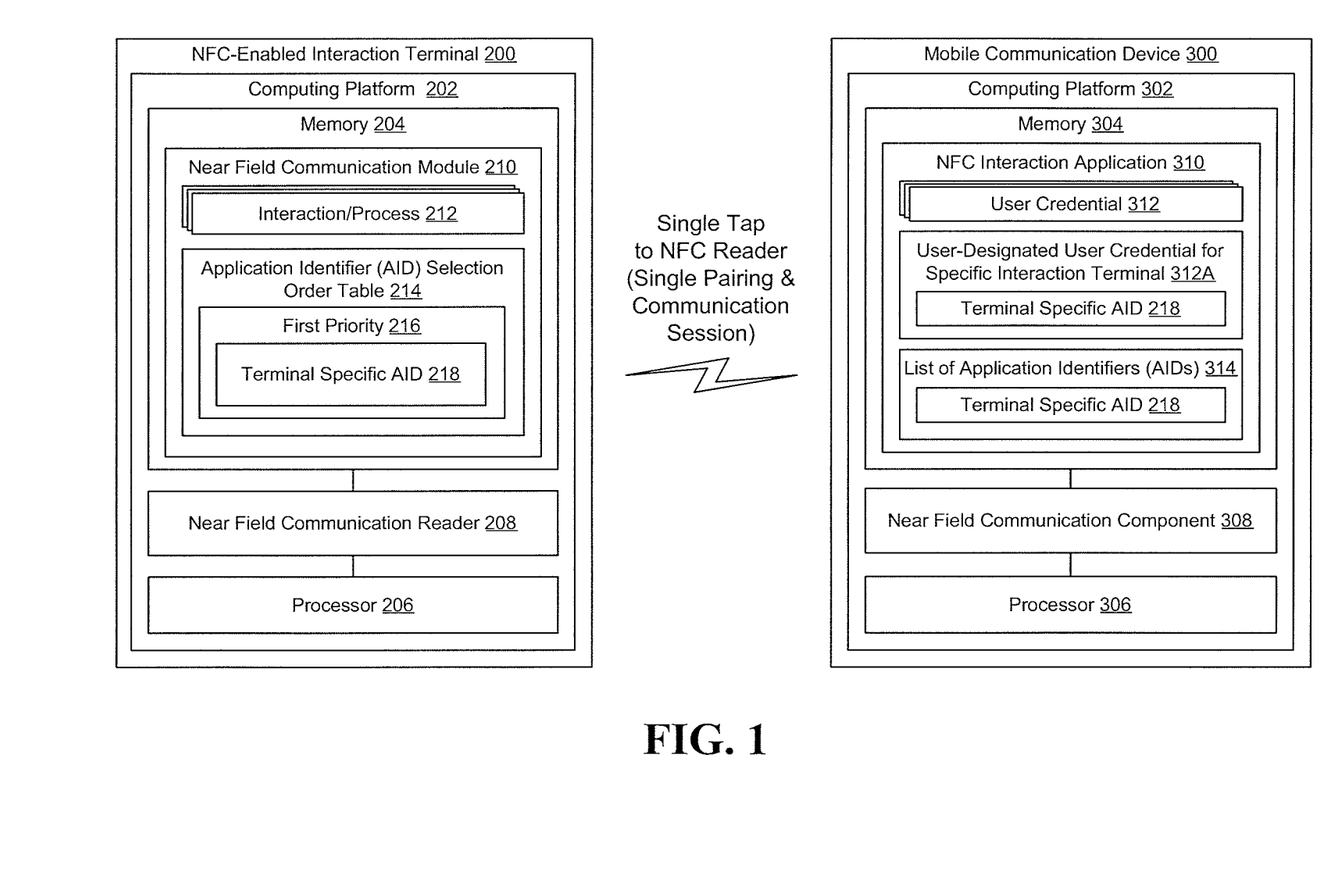
FIG. 1 provides a block diagram of a system for identifying for optimizing Near Field Communication (NFC), in accordance with embodiments of the present invention.

Referring to FIG. 1, a block diagram is shown of a system 100 for optimizing Near Field Communications (NFC) between a mobile communication device 300 and an NFC-enabled interaction terminal 200 in accordance with embodiments of the present invention. In specific embodiments of the invention, the NFC-enabled interaction terminal 200 comprises an Automated Teller Machine (ATM) or an identification terminal (e.g., a Personal Identification Number (PIN) entry terminal at a financial institution used for identification purposes). However, the NFC-enabled interaction terminal may be any NFC-enabled interaction terminal which a user desires to apply specific user credentials to the interaction (i.e., user credentials other than the default user credentials).

The NFC-enabled interaction device 200 includes a computing platform 202 that can receive and execute algorithms, such as routines, and applications. Computing platform 202 includes memory 204, which may comprise volatile and non-volatile memory, such as read-only and/or random-access memory (RAM and ROM), EPROM, EEPROM, flash cards, or any memory common to computer platforms). Moreover, memory 204 may comprise cloud storage, such as provided by a cloud storage service and/or a cloud connection service.

Further, computing platform 202 also includes processor 206, which may be an application-specific integrated circuit ("ASIC"), or other chipset, processor, logic circuit, or other data processing device. Processor 206 or other processor such as ASIC may execute an application programming interface ("API") (not shown in FIG. 1) that interfaces with any resident programs, such as Near Field Communication Module 210 and routines, sub-modules associated therewith or the like stored in the memory 204 of the NFC-enabled interaction terminal 200.

Processor 206 includes various processing subsystems (not shown in FIG. 1) embodied in hardware, firmware, software, and combinations thereof, that enable the functionality of NFC-enabled interaction terminal 200 and the operability of the terminal 200 on a network. For example, processing subsystems allow for initiating and maintaining communications and exchanging data with other networked devices. For the disclosed aspects, processing subsystems of processor 206 may include any subsystem used in conjunction with NFC module 210 and related algorithms, sub-algorithms, modules, sub-modules thereof.

Computer platform 202 may additionally include communications module (not shown in FIG. 1) embodied in hardware, firmware, software, and combinations thereof, that enables communications among the various components of the terminal 200, as well as between the other networked devices. Thus, communication module may include the requisite hardware, firmware, software and/or combinations thereof for establishing and maintaining a network communication connection.

Computing platform 202 additionally includes NFC reader 208, which is the component configured to read information from a NFC tag.

The memory 204 of terminal 200 stores Near Field Communication (NFC) module 210 that is executable by the processor 210 and configured to implement the NFC reader 208 to conduct interactions 210 at the terminal using NFC as the communication mechanism. According to specific embodiments of the invention, in which the terminal 200 is an ATM, the interaction 210 includes implementing the user credentials to authorize a transaction (e.g., withdrawal, deposit, balance check, loan payment or the like) using the transaction vehicle (e.g., debit card/account) associated with the user credentials.

In specific embodiments of the invention, the Near Field Communication (NFC) module 210 stores an Application Identifier (AID) selection order table 214 that defines the order of priority for selecting an AID from a list of AIDs 314 returned from the mobile communication device 300, upon the mobile communication device initiating an NFC session (i.e., providing a single tap 102 to the NFC reader 208). Each AID in the list is associated with one of a plurality of user credentials stored in NFC interaction application 310, such as mobile wallet application or the like. In those embodiments in which the NFC interaction application 310 is a mobile wallet application, the user credentials may include payment vehicles, such that each AID is associated with a payment vehicle, such as, a distinct credit card, debit card or the like.

According to specific embodiments of the invention, the AID selection order table is configured such that a terminal-specific AID 218 is provided first priority 216. In this regard, if the list of AIDs 314 communicated from the NFC interaction application 310 includes the terminal-specific AID 218, the user credentials associated with the terminal-specific AID will be used for the interaction 212. For example, in the mobile wallet/ATM scenario, if the mobile communication device 300 communicates the list of AIDs 314, which includes the terminal-specific AID 218, the AID selection process performed by the NFC module 210 will recognize the terminal-specific AID 218 and the payment vehicle associated with the terminal-specific AID will used to conduct the transactions at the ATM. Alternatively, if the NFC-enabled interaction terminal 200 is an identification terminal 200 the user credentials (e.g., payment vehicle or other identification means) associated with the terminal-specific AID will be used to authenticate/identify the user.

The mobile communication device 300 includes a computing platform 302 that can receive and execute algorithms, such as routines, and applications. Computing platform 302 includes memory 304, which may comprise volatile and non-volatile memory, such as read-only and/or random-access memory (RAM and ROM), EPROM, EEPROM, flash cards, or any memory common to computer platforms). Moreover, memory 304 may comprise cloud storage, such as provided by a cloud storage service and/or a cloud connection service.

Further, computing platform 302 also includes processor 306, which may be an application-specific integrated circuit ("ASIC"), or other chipset, processor, logic circuit, or other data processing device. Processor 306 or other processor such as ASIC may execute an application programming interface ("API") (not shown in FIG. 1) that interfaces with any resident programs, such as NFC Interaction Application 310 and routines, sub-modules associated therewith or the like stored in the memory 304 of the mobile communication device 300.

Processor 306 includes various processing subsystems (not shown in FIG. 1) embodied in hardware, firmware, software, and combinations thereof, that enable the functionality of the mobile communication device 300 and the operability of the device 300 on a network, such as a cellular/mobile network, a Local Area Network (LAN) or the like. For example, processing subsystems allow for initiating and maintaining communications and exchanging data with other networked devices. For the disclosed aspects, processing subsystems of processor 306 may include any subsystem used in conjunction with NFC interaction application 310 and related algorithms, sub-algorithms, modules, sub-modules thereof.

Computer platform 302 may additionally include communications module (not shown in FIG. 1) embodied in hardware, firmware, software, and combinations thereof, that enables communications among the various components of the device 300, as well as between the other networked devices. Thus, communication module may include the requisite hardware, firmware, software and/or combinations thereof for establishing and maintaining a network communication connection.

Computing platform 302 additionally includes NFC component 308, otherwise referred to as the NFC chip or tag which is the configured to send and receive NFC communications to and from NFC reader 208 of NFC-enabled interaction terminal 200.

The memory 204 of device 300 stores NFC interaction application 310, which according to specific embodiments of the invention, may comprise a mobile/digital wallet application, The NFC interaction application 310 is executable by the processor 210 and the NFC component 308 and stores a plurality of user credentials 312. In those embodiments in which the NFC interaction application 310 is a mobile/digital wallet application, the user credentials may comprise payment vehicles, such as different payment cards/accounts, such as credit cards, debit cards and the like. The NFC interaction application 310 is configured to, in response to a single tap 102 (i.e., single paring and communication session) to the NFC reader 208 of NFC-enabled interaction terminal 200, automatically apply a user-designated one of the user credentials 312 to an interaction performed at the NFC-enabled interaction terminal 300. In those embodiments in which the NFC interaction application 310 is a mobile/digital wallet application and the NFC-enabled interaction terminal 200 is a an ATM, the mobile/digital wallet application is configured to, in response to a single tap 102 at the NFC reader 208 on the ATM, automatically apply the payment vehicle (e.g., debit card or the like) that the user has designated for ATM transactions or for a specific entity/financial institution's ATM transactions (i.e., embodiments of the invention may provide for a user to designate one payment vehicle for all ATM transactions or for a user to designate different payment vehicles for different entity's/financial institution ATMs in other words payment vehicle/debit card X may be designated for use at financial institution X's ATMs and payment vehicle/debit card Y may be designated for use at financial institution Y's ATMs and the like).

As previously discussed, according to specific embodiments of the invention, automatically applying a user-designated one of the user credentials 312 to an interaction performed at the NFC-enabled interaction terminal 300, is made possible by receiving a user input that designates one 312A of the user credentials for specific interaction terminal use. The user input may be received at the NFC interaction application 310 or received at an auxiliary application, such as a mobile or online financial institution application, and subsequently communicated to the NFC interaction application 310. In response to receiving the user input of the designated user credentials 312A, the user credentials 312A are associated with a terminal-specific Application Identifier (AID) 218 and the terminal-specific AID is added to the list of AIDs 313 stored in the NFC interaction application 310.

In use, in response to the mobile communication device 300/NFC interaction application 310 providing a single tap (i.e., single pairing/communication session) to the NFC reader 208 of the NFC-enabled interaction terminal 200 and receiving a command for user credential selection, the NFC interaction application 310 will return the list of AIDs 314 to the NFC-enabled interaction terminal 300, which includes the terminal-specific AID 218. In response to the NFC module 210 at the NFC-enabled interaction terminal 200 recognizing and prioritizing to select the terminal specific AID and notifying the NFC interaction application 310 of the selection, the NFC interaction application 310 processes remaining commands using the user-designated user credentials 312A as defined by the associated terminal-specific AID.

Figure 2:
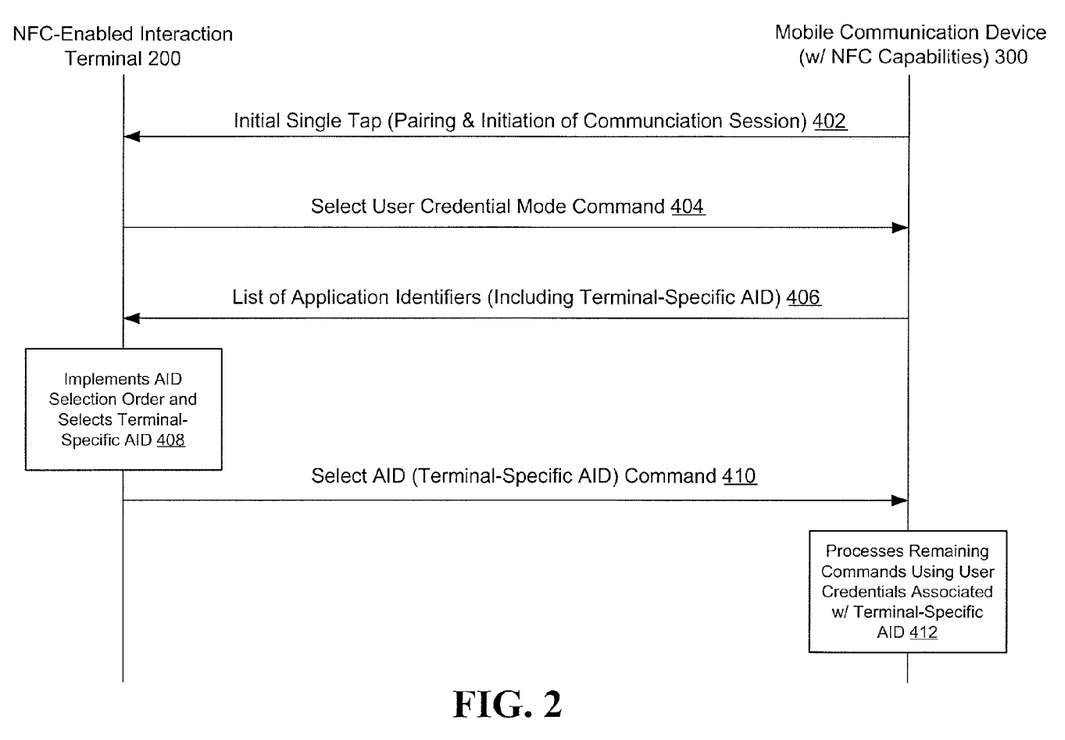
FIG. 2 provides a block diagram of command flow for selecting a user-designated user credentials for processing an interaction at an NFC-enabled interaction terminal, in accordance with embodiments of the present invention.

Referring to FIG. 2 a modified signaling diagram 400 is presented that highlights the related signaling between the NFC enabled interaction terminal 200 and the mobile communication device 300, in accordance with embodiments of the present invention. At 402, a single tap is provided by the mobile communication device at the NFC-enable interaction terminal 200, which serves to pair the device to the terminal and initiate the communication session. As previously discussed, the invention allows for a user to pre-designate user credentials for specific terminals, such that the pre-designated user credentials are applied to the interaction based on a single tap at the NFC reader, as opposed to changing out the user credentials in response to multiple taps (i.e., two or more taps). By limiting the number of taps to a single tap (i.e., one tap) the present invention provides a more optimized user experience at the NFC-enabled interaction terminal 200.

At 404, the NFC-enabled interaction terminal 200 communicates, via NFC, a select user credentials mode command to the mobile communication device 300/NFC interaction application 310. In those embodiments of the invention, in which the NFC-enabled interaction terminal is an ATM and the NFC interaction application 310 is a mobile/digital wallet application, the select user credentials mode command may comprise select Proximate Payment System Environment (PPSE). At 406, in response to receiving the select user credential mode command 404, the mobile communication device 300 communicates, via NFC, the list of AIDs 314, including the terminal-specific AID 218.

At Event 408, the NFC-enabled interaction device 200, implements the AID selection order to selects the terminal-specific AID 218 form the list of AIDs 314, based on the terminal-specific AID 218 having the highest/first priority 216. In response to selecting the terminal-specific AID, the NFC-enabled interaction terminal 200 communicates, via NFC, a select AID command to the mobile communication device 300 that indicates selection of the terminal-specific AID 218.

At Event 412, the NFC interaction application 310 processes the remaining commands using the pre-designated user credentials 312A associated with the terminal-specific AID 218 and the ATM processes responses from the user at the NFC interaction terminal 300 in a normal fashion (i.e., as if the user had conducted a non-NFC interaction/transaction).

Figure 3:
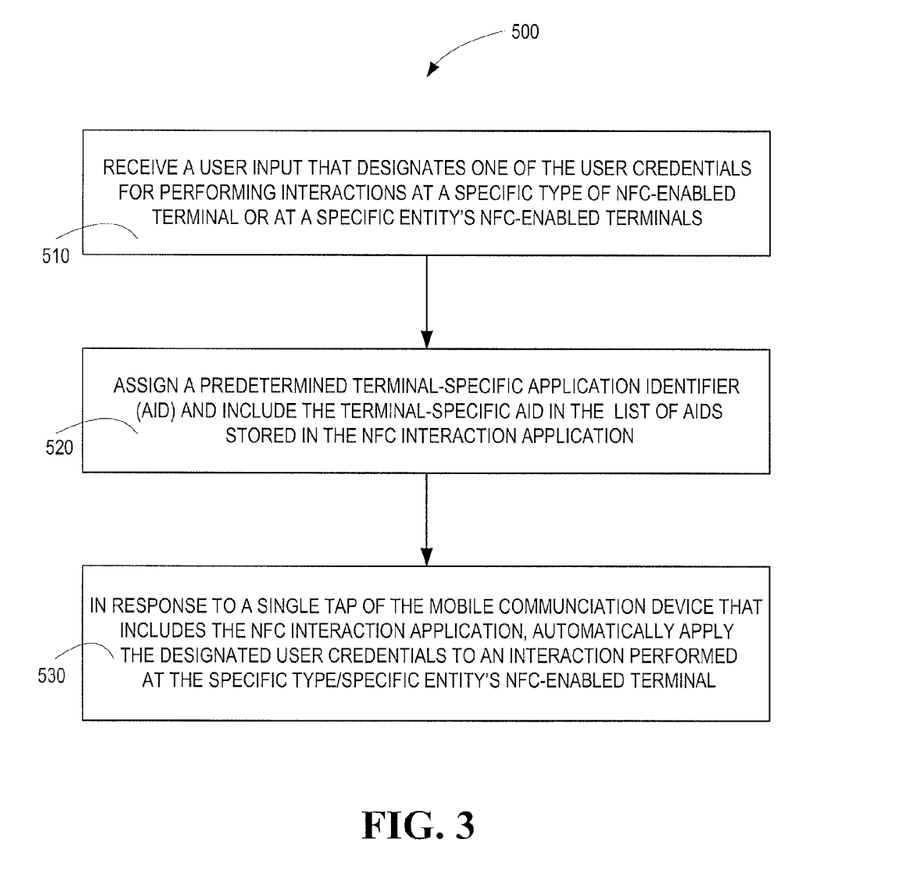
FIG. 3 provides a flow diagram of a method for optimizing Near Field Communication (NFC), in accordance with embodiments of the present invention.

Referring to FIG. 3 a flow diagram is depicted of a method 500 for optimizing Near Field Communication (NFC) between an NFC-enabled interaction terminal and a mobile communication device, in accordance with embodiments of the present invention. At Event 510, A user input is received that designates one of the user credentials for performing interactions at a specific type of NFC enabled terminal or at a specific entity's NFC-enabled interaction terminals. In specific embodiments of the invention, the input may be received at the NFC interaction application executing on a mobile communication device or, in other embodiments of the invention, the user input may be received at an auxiliary application and communicated to the NFC interaction application.

At Event 520, a predetermined terminal-specific Application Identifier (AID) is assigned to the designated one of the user credentials and the terminal-specific AID is added to the list/array of AIDs stored within the NFC interaction application.

At Event 530, in response to a single tap (i.e., single pairing and communication session) of the mobile communication device that includes the NFC interaction application at the NFC-enabled interaction terminal, the designated user credentials are automatically applied to the interaction being performed at the specific type or specific entity's NFC-enabled interaction terminal. In specific embodiments of the invention, automatic application of the user-designated user credentials is made possible by communicating, from the NFC interaction application in response to the single tap, the list of AIDs, including the terminal-specific AID. The NFC-enabled interaction terminal recognizes the terminal-specific AID in the list and selects the terminal-specific AID based the terminal-specific AID being the highest priority AID. In response the, NFC interface application processes all remaining commands using the pre-designated user credentials associated with the terminal-specific AID, as opposed to the default user credentials used to process interactions on other terminals.

Thus, systems, apparatus, methods, and computer program products described above provide for optimizing the user experience at an NFC-enabled interaction terminal when using an NFC-based interaction application by seamlessly providing for user-designated user credentials to be automatically/applied to the interaction/transaction as opposed to the default user credentials.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for optimizing Near Field Communication (NFC) at an NFC-enabled interaction terminal, the system comprising:
a mobile communication device including:
    a first memory,
    a first processor,
    an NFC component, and
    an NFC interaction application stored in the first memory, executable by the first processor and the NFC component, wherein the NFC interaction application stores a plurality of user credentials, and wherein the NFC interaction application is configured to:
        receive at least one user input, each user input associates one of the plurality of user credentials to a specific type of interaction terminal,
        assign at least one terminal-specific Application Identifier (AID) to the one of the plurality of user credentials, wherein the terminal-specific AID is associated with the specific type of interaction terminal, and add the terminal-specific AID to a list of a plurality of AIDs stored by the NFC interaction application, and in response to a single tap to an NFC reader, communicate, via NFC, the list of the plurality of AIDs; and an NFC-enabled interaction terminal of a first type, including:
a second memory,
a second processor,
the NFC reader, and
an NFC module stored in the second memory, executable by the second processor and configured to:
in response to receiving, via NFC, the list of the plurality of AIDs, perform one of (i) selecting the terminal-specific AID associated with the first type of NFC-enabled interaction terminal based on the terminal-specific AID associated with the first type of NFC-enabled interaction terminal being included in the list of the plurality of AIDs, and (ii) in response to determining that the terminal-specific AID associated with the first type of NFC enabled interaction terminal is not included in the list of the plurality of AIDs, selecting another AID from the list of the plurality of AIDs based on an AID selection order table stored at the NFC-enabled interaction terminal, and
communicate, via NFC, an AID select command to the NFC interaction application that indicates selection of the terminal-specific AID or the other AID from the list of the plurality of AIDs,
wherein the NFC interaction application is further configured to, in response to receiving the AID select command, process further commands from the NFC-enabled interaction terminal using the user credentials associated with the terminal-specific AID or the other AID.

2. The system of claim 1, wherein the NFC interaction application is further configured to communicate, via NFC, the list of the plurality of AIDs to the NFC module in response to receiving, via NFC, a credential request command from the NFC module.

3. The system of claim 1, wherein the first type of NFC-enabled interaction terminal is further defined as one of an Automated Teller Machine (ATM) or an identification terminal.

4. The system of claim 1, wherein the NFC interaction application is further defined as a digital wallet application.

5. The system of claim 1, further comprising an auxiliary application, stored in third memory, executable by a third processor, in distributed network communication with the NFC interaction application, wherein the auxiliary application is configured to (i) receive one or more user inputs, wherein each input designates one of the user credentials to a specific type of interaction terminal, and (ii) communicate the designations to the NFC interaction application.

6. A mobile communication apparatus for optimizing Near Field Communication (NFC) at an NFC-enabled interaction terminal of a first type, the apparatus comprising:
a computing platform including a memory and at least one processor in communication the memory;
a Near Field Communication (NFC) component; and
an NFC interaction application stored in the memory, executable by the processor and the NFC component, wherein the application stores a plurality of user credentials, and wherein the application is configured to:
receive at least one user input, each user input associates one of the plurality of user credentials to a specific type of interaction terminal, assign at least one terminal-specific Application Identifier (AID) to the one of the plurality of user credentials, wherein the terminal-specific AID is associated with the specific type of interaction terminal, and add the terminal-specific AID to a list of a plurality of AIDs stored by the NFC interaction application,
in response to a single tap to an NFC reader associated with the NFC-enabled interaction terminal, communicate, via NFC to the NFC reader, the list of a plurality of AIDs,
receive, via NFC from the NFC-enabled interaction terminal, an AID select command that indicates selection of the interaction terminal associated terminal-specific AID or another AID, and
in response to receiving the AID select command, process further commands from the NFC-enabled interaction terminal using the user credentials associated with the terminal-specific AID or the other AID,
wherein the NFC-enabled interaction terminal is configured to, in response to receiving the list of the plurality of AIDs, perform one of (i) select the terminal-specific AID associated with the first type of NFC-enabled interaction terminal based on the terminal-specific AID associated with the first type of NFC-enabled interaction terminal being included in the list of the plurality of AIDs, and (ii) in response to determining that the terminal-specific AID associated with the first type of NFC-enabled interaction terminal is not included in the list of the plurality of AIDs, selecting the other AID from the list of the plurality of AIDs based on an AID selection order table stored at the NFC-enabled interaction terminal.

7. The apparatus of claim 6, wherein an auxiliary application in network communication with the NFC interaction application is configured to receive one or more user inputs, wherein each input designates one of the user credentials to a specific type of interaction terminal.

8. The apparatus of claim 6, wherein the application is further defined as a digital wallet application.

9. A method for optimizing Near Field Communication at an NFC-enabled interaction terminal of a first type, the method comprising:
receiving, by a computing device processor, at least one user input, each user input associates one of a plurality of user credentials to a specific type of interaction terminal;
assigning, by a computing device processor, at least one terminal-specific Application Identifier (AID) to the one of the plurality of user credentials, wherein the terminal-specific AID is associated with the specific type of interaction terminal and including the terminal-specific AID in a list of a plurality of AIDs stored within an application;
in response to a single tapping of a device executing the application at an NFC reader disposed within the NFC-enabled interaction terminal:
communicating, via NFC to the NFC reader, the list of the plurality of AIDs,
receiving, via NFC from the NFC-enabled interaction terminal, an AID select command that indicates selection of the terminal-specific AID or another AID from the list of the plurality of AIDs, and
in response to receiving the AID select command, processing further commands from the NFC-enabled interaction terminal using the user credentials associated with the terminal-specific AID or the other AID, wherein the NFC-enabled interaction terminal is configured to, in response to receiving the list of the plurality of AIDs, perform one of (i) select the terminal-specific AID associated with the first type of NFC-enabled interaction terminal based on the terminal-specific AID associated with the first type of NFC-enabled interaction terminal being included in the list of the plurality of AIDs, and (ii) in response to determining that the terminal-specific AID associated with the first type of NFC-enabled interaction terminal is not included in the list of the plurality of AIDs, selecting another AID from the list of the plurality of AIDs based on an AID selection order table stored at the NFC-enabled interaction terminal.

10. The method of claim 9, wherein communicating the list of the plurality of AIDs occurs in response to receiving, via NFC, a credential request command from an NFC module.

\* \* \* \* \*